United States Patent
Kuwabara et al.

(10) Patent No.: US 7,909,512 B2
(45) Date of Patent: Mar. 22, 2011

(54) LUBRICATING MEMBER FOR LINEAR MOTION ROLLING GUIDE UNIT AND SLIDER FOR LINEAR MOTION ROLLING GUIDE UNIT USING THE LUBRICATING MEMBER

(75) Inventors: Hideki Kuwabara, Mino (JP);
Masatoshi Kondo, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 417 days.

(21) Appl. No.: 12/049,663

(22) Filed: Mar. 17, 2008

(65) Prior Publication Data
US 2008/0232724 A1  Sep. 25, 2008

(30) Foreign Application Priority Data

Mar. 20, 2007  (JP) ................................. 2007-073668

(51) Int. Cl.
*F16C 33/10* (2006.01)

(52) U.S. Cl. ............................................. 384/13; 184/5

(58) Field of Classification Search ................ 384/5, 13, 384/15, 45, 49, 51
See application file for complete search history.

(56) References Cited

U.S. PATENT DOCUMENTS

| 5,772,333 | A | * | 6/1998 | Yabe et al. ...................... 384/13 |
| 6,082,899 | A | * | 7/2000 | Suzuki et al. .................... 384/45 |
| 6,155,717 | A | * | 12/2000 | Michioka et al. ............... 384/15 |
| 6,257,766 | B1 | * | 7/2001 | Agari .............................. 384/45 |
| 6,290,394 | B1 | * | 9/2001 | Obara et al. .................... 384/13 |
| 6,401,867 | B1 | * | 6/2002 | Michioka et al. ............... 384/13 |
| 6,705,430 | B2 | * | 3/2004 | Michioka et al. ................. 184/5 |
| 7,146,870 | B2 | * | 12/2006 | Kuo et al. ........................ 384/45 |
| 7,556,430 | B2 | * | 7/2009 | Wu et al. ......................... 384/13 |
| 2008/0159668 | A1 | * | 7/2008 | Wu et al. ......................... 384/13 |

FOREIGN PATENT DOCUMENTS

| JP | 9-152095 | | 6/1997 |
| JP | 2006234039 | A * | 9/2006 |
| TW | 440660 | A * | 6/2001 |

* cited by examiner

*Primary Examiner* — Marcus Charles
(74) *Attorney, Agent, or Firm* — Cozen O'Connor

(57) ABSTRACT

A lubricating member is capable of being used in any type of linear motion rolling guide unit and of appropriately lubricating raceway faces over a long period. The lubricating member used in a linear motion rolling guide unit comprises a body 4 impregnated with a lubricant and being in contact with raceway faces of a rail to supply the lubricant to the raceway faces. The body 4 comprises either a single or a plurality of embedding portions 8 having either a recess or a hole. A saturation holding member 9 is embedded in the embedded portion 8. The saturation holding member 9 holds a larger amount of lubricant per unit volume than the body 4 holds the amount of lubricant, and has a relationship ensuring that it has a force sucking the lubricant equal to or smaller than that the body 4 has.

1 Claim, 8 Drawing Sheets

LUBRICATING MEMBER FOR LINEAR MOTION ROLLING GUIDE UNIT AND SLIDER FOR LINEAR MOTION ROLLING GUIDE UNIT USING THE LUBRICATING MEMBER

BACKGROUND OF THE INVENTION

1. Field of the Invention

This invention relates to a linear motion rolling guide unit equipped with a slider moved relative to a rail.

2. Description of the Related Art

In a linear motion rolling guide unit equipped with a slider moved relative to a rail, the application of a lubricant to the raceway faces of the rail makes the relative movement of the slider to the rail smooth.

Various methods by which the raceway faces are lubricated have been provided such as a method of lubricating the rolling elements rolling on the raceway faces or a method of directly lubricating the raceway faces. When the raceway faces are directly lubricated, a lubricating member disclosed in JP-H9-152095-A, for example, is employed.

The lubricating member is impregnated with a lubricant including oil and the like. A part of the lubricating member is secured to the slider in such a manner as to be in contact with the raceway faces. Therefore, when the slider slides on the raceway faces, the lubricant is supplied to the raceway faces of the rail from the lubricating member to lubricate the raceway faces.

As the raceway faces are thus lubricated, it goes without saying that the lubricant is gradually drained from the lubricating member, and eventually becomes incapable of lubricating the raceway faces. To avoid this, the above-described lubricating member is designed to be refilled with the lubricant later in order for the raceway faces to be lubricated for a long time. The structure of the lubricating member will be described below with reference to FIG. 8.

The lubricating member shown in FIG. 8 includes a body 101 impregnated with a lubricant including oil and the like. The body 101 has a top face 102 on which a pair or recessed portions 103 have open ends. The recessed portions 103 have a depth ranging from the top face 102 to the approximate midway-level of the body 101. A liquid lubricant 104 such as oil is stored in the recessed portions 103.

When the lubricating member, together with the slider, slides on the rail, the lubricant pre-immersed in the texture of the body 101 seeps gradually onto the raceway faces. While the raceways faces are thus lubricated by the seeping lubricant, the liquid lubricant 104 stored in the recessed portions 103 gradually spreads into the spaces between the molecular bonds in the body 101.

After the liquid lubricant has been absorbed by the body 101, an additional liquid lubricant 104 is fed into the recessed portion 103 from the top face 102 of the body 101. As a result, the lubricant can lubricate the raceway faces for a long time without being exhausted from the body 101.

In the aforementioned lubricating member, the recessed portions 103 for storing the liquid lubricant 104 have open ends formed in the top face 102 of the body 101. Such a conventional lubricating member having recessed portions 103 with open ends formed in the top face 102 can be employed only when the top face 102 is located in the upper area as shown in FIG. 8.

Specifically, if the recessed portions 103 are not located with their open ends facing upward, the liquid lubricant 104 will spill out from the recessed portions 103. For this reason, such a lubricating member is employed only in a slider sliding on the rail laid in the horizontal position, and cannot be employed in a slider sliding on a rail laid on a wall or a ceiling.

As so described, a conventional lubricating member has the problem of severely limiting the types of linear motion rolling guide units capable of using the lubricating member.

The conventional lubricating member has the recessed portions 103 refilled with the liquid lubricant 104. When the liquid lubricant 104 is directly supplied in the recessed portions 103, the liquid lubricant 104 is absorbed extremely quickly in a large amount by the body 101.

Such absorption of the liquid lubricant 104 into the body 101 causes over-impregnation of the body 101 with the lubricant. As a result, more than necessary amount of lubricant is fed onto the raceway faces, so that the lubricant is consumed more quickly. This gives rise to the impossibility of moderately lubricating the raceway faces over a long period.

SUMMARY OF THE INVENTION

It is an object of the present invention to provide a lubricating member for a linear motion rolling guide unit and a slider for a linear motion rolling guide unit using the lubricating member, which is capable of being used in any type of linear motion rolling guide unit and of moderately lubricating raceway faces over a long period.

A first aspect of the present invention provides a lubricating member used in a linear motion rolling guide unit and having a body that is impregnated with a lubricant and in contact with raceway faces of a rail to supply the lubricant to the raceway faces. The lubricating member is characterized by the body that is provided with either an embedding portion or a plurality of embedding portions having either a recess or a hole, and by a saturation holding member that is embedded in the embedded portion of the body, holds a larger amount of lubricant per unit volume than the body holds the amount of lubricant, and has a relationship ensuring that the saturation holding member has a force sucking the lubricant equal to or smaller than that the body has.

A second aspect of the present invention provides a slider used in a linear motion rolling guide unit and provided with a pair of end caps respectively secured to ends of a casing, endless circulating passages which are provided inside the casing and the end caps and in which rolling elements are incorporated and roll, and a lubricating member having a body which is impregnated with a lubricant and is attached to either one or both of the end caps, in which the lubricating member impregnated with the lubricant is in contact with raceway faces of a rail to supply the lubricant to the raceway faces while the rolling elements rolling on the raceway faces to move the slide relative to the rail. The slider is characterized by either an embedding portion or a plurality of embedding portions having either a recess or a hole and provided in the body of the lubricating member, and by a saturation holding member that is embedded in the embedded portion of the body, holds a larger amount of lubricant per unit volume than the body holds the amount of lubricant, and has a relationship ensuring that the saturation holding member has a force sucking the lubricant equal to or smaller than that the body has.

In the present invention, the body is preferably provided with a blocking member attached thereto for sealing the embedding portion. The blocking member preferably has either a feed hole or a plurality of feed holes for linking the embedding portion to the outside.

In the present invention, the blocking member is preferably formed of the same materials as those of the body.

In the present invention, the embedding portion preferably has an open end facing in a sliding direction of the slider.

According to the first aspect of the present invention, since the saturation holding member impregnated with a lubricant is mounted in the body, whatever direction the lubricating member is placed in, the lubricant does not spill out. Accordingly, whatever location and whatever direction the slider is used in, the lubricating member can be employed in this slider.

The saturation holding member is saturated with and holds the lubricant. This makes it possible to gradually supply the lubricant to the body. Accordingly, since a large amount of lubricant is not absorbed by the body, the lubricating member can be prevented from being oversupplied with the lubricant so as to remain in a state of moderate impregnation with the lubricant. Because the body is impregnated with a moderate amount of lubricant as described above, a more than necessary amount of lubricant is not supplied onto the raceway faces and the lubricant is not exhausted earlier than required. In short, the use of the lubricating member according to the present invention makes it possible to moderately lubricate the raceway faces for a long period.

According to the second aspect of the present invention, since the saturation holding member impregnated with a lubricant is mounted in the body, whatever direction the lubricating member is placed in, the lubricant does not spill out. Accordingly, whatever location and whatever position the rail is laid in, such as on a wall or on a ceiling, the slider is capable of sliding on the rail.

Gradual supply of additional lubricant to the lubricating member is achieved by impregnating the saturation holding member with the lubricant so as for the saturation holding member to hold it.

Accordingly, since a large amount of lubricant is not absorbed by the body, the body can be prevented from being oversupplied with the lubricant so as to remain in a state of moderate impregnation with the lubricant. Because the body is impregnated with a moderate amount of lubricant as described above, a more than necessary amount of lubricant is not supplied onto the raceway faces and the lubricant is not exhausted earlier than required. In short, the use of the lubricating member A makes it possible to moderately lubricate the raceway faces for a long period.

According to the present invention, the embedding portion in which the saturation holding member is embedded is sealed by the blocking member, the saturation holding member is prevented from drying by being exposed to air. Further, because the blocking member has a feed hole for linking the embedding portion to the outside, an additional lubricant can be supplied to the saturation holding member through the feed hole without disassembling the lubricating member.

According to the present invention, the amount of lubricating held by the entire lubricating member is increased because the blocking member is formed of the same materials as those of the body.

Further, according to the present invention, even when another apparatus or the like is mounted on the slider, the supply of additional lubricant to the saturation holding member is made possible because the embedding portion has an open end facing in the sliding direction of the slider.

BEST MODE FOR CARRYING OUT THE INVENTION

A first embodiment according to the present invention will be described below with reference to FIGS. 1 and 2.

Figure 1:
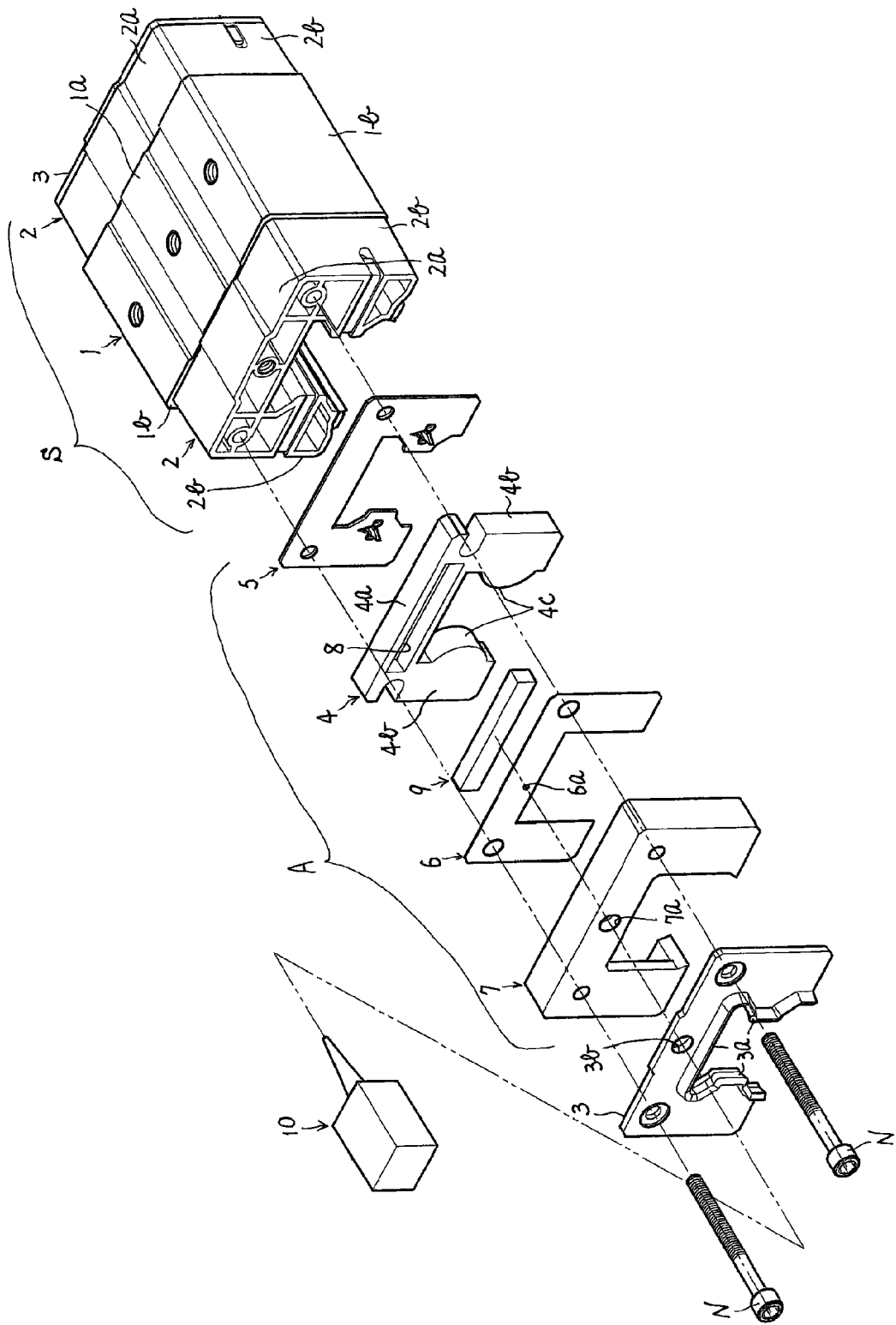
FIG. 1 is an exploded view of a lubricating member of a first embodiment according to the present invention.

FIG. 1 illustrates a slider for a linear motion rolling guide unit using a lubricating member of the present invention. The slider S straddles and slides on a rail having raceway faces formed on the side faces.

Specifically, the slider S comprises a casing 1 and end caps 2 respectively secured at the opposing ends of the casing 1. Endless circulation passages are formed inside the casing 1 and the end caps 2. A plurality of rolling elements, which in this embodiment are rollers, are endlessly circulated in the endless circulation passages. The casing 1 includes a flatbed portion 1a, and a pair of side portions 1b which extend out from the respective sides of the flatbed portion 1a at right angles. Similar to the casing 1, each of the end caps 2 includes a flatbed portion 2a and a pair of side portions 2b extending out from the respective sides of the flatbed portion 2a at right angles. That is, the entire slider S comprises a flatbed portion and side portions extending out from the respective sides of the flatbed portion at right angles. The endless circulation passages are formed inside the side portions and retain the rolling elements rolling therein.

The rolling elements are exposed on the opposing side faces of the pair of side portions 1b of the casing 1, where the rolling elements roll on the raceway faces of the rail to achieve the relative movement of the slider to the rail.

An end-face seal 3 is secured on the face of one of the end caps 2 (the right end cap 2 on the right side in FIG. 1) opposite to the contact face with the casing 1. The end-face seal 3 is provided independently of the end cap 2, and provided with a lip portion 3a (see the left end-face seal 3 in FIG. 1) which is in contact with the raceway faces of the rail in order to prevent dust and the like from entering the inside of the slider S when the slider S slides on the rail.

The end-face seal 3 is also secured to the other end cap 2 (the left end cap 2 in FIG. 2), but at this end a lubricating member A of the present invention is interposed between the end-face seal 3 and the end cap 2.

The lubricating member A comprises a body 4, a plate 5 secured to one face of the body 4, an oil packing 6 secured to the other face of the body 4, and a case 7 incorporating the body 4, the plate 5 and the oil packing 6.

The body 4 is formed, for example, of a synthetic resin with oil through a pressure one-piece molding technique or of a granular synthetic resin which is impregnated with a lubricant after having been molded. The body 4 is a resin-made member in which a lubricant such as oil is immersed in fine continuous foam produced in the molding process.

As in the case of the casing 1 and the end caps 2, the body 4 includes a flatbed portion 4a and a pair of side portions 4b extending out from the sides of the flatbed portion 4a at right angles. Arc-shaped contact lubricators 4c respectively protrude from the opposing faces of the respective side portions 4b. The contact lubricators 4c maintain a dimensional relationship to the rail that ensures the contact lubricators 4c are in light contact with the raceway faces on the side faces of the rail when the slider S straddles the rail.

The flatbed portion 4a of the body 4 incorporates an embedding portion 8 having a recess of which the open end is located in a face of the flatbed portion 4a in the sliding direction of the slider S. The recess of the embedding portion 8 has a rectangular cross section extending between the opposing side portions 4b. A saturation holding member 9 is inserted and fixed in the recess, and pressed into the recess as required.

The saturation holding member 9 is formed of materials capable of being saturated with a lubricant, such as a felt material. Any material can be employed as the saturation holding member 9 as long as it can be saturated with a lubricant and has a larger oil-impregnating space per unit volume, that is, it holds a greater amount of lubricant per unit volume than the body 4 does.

However, it is necessary that the force sucking the lubricant into the saturation holding member 9 is equal to or smaller than that into the body 4. The force sucking the lubricant referred to here means the strength of sucking the lubricant into the saturation holding member 9 or the body 4 by capillary action or surface tension. In any case, the relationship between the sucking forces in the saturation holding member 9 and the body 4 is required to be a relationship such that the lubricant seeps from the saturation holding member 9 into the body 4.

After the saturation holding member 9 is secured in the embedding portion 8 of the body 4, an oil packing 6 is placed over the face of the body 4 to seal the open end of the embedding portion 8. The oil packing 6 is formed in a shape approximately covering the face (facing in the sliding direction of the slider S) of the body 4 except for the contact lubricators 4c. The oil packing 6 has a feed hole 6a which is a small-diameter hole formed in a position corresponding to the embedding portion 8, so that the embedding portion 8 communicates with the outside through the feed hole 6a.

The oil packing 6 corresponds to the blocking member of the present invention.

Figure 2:
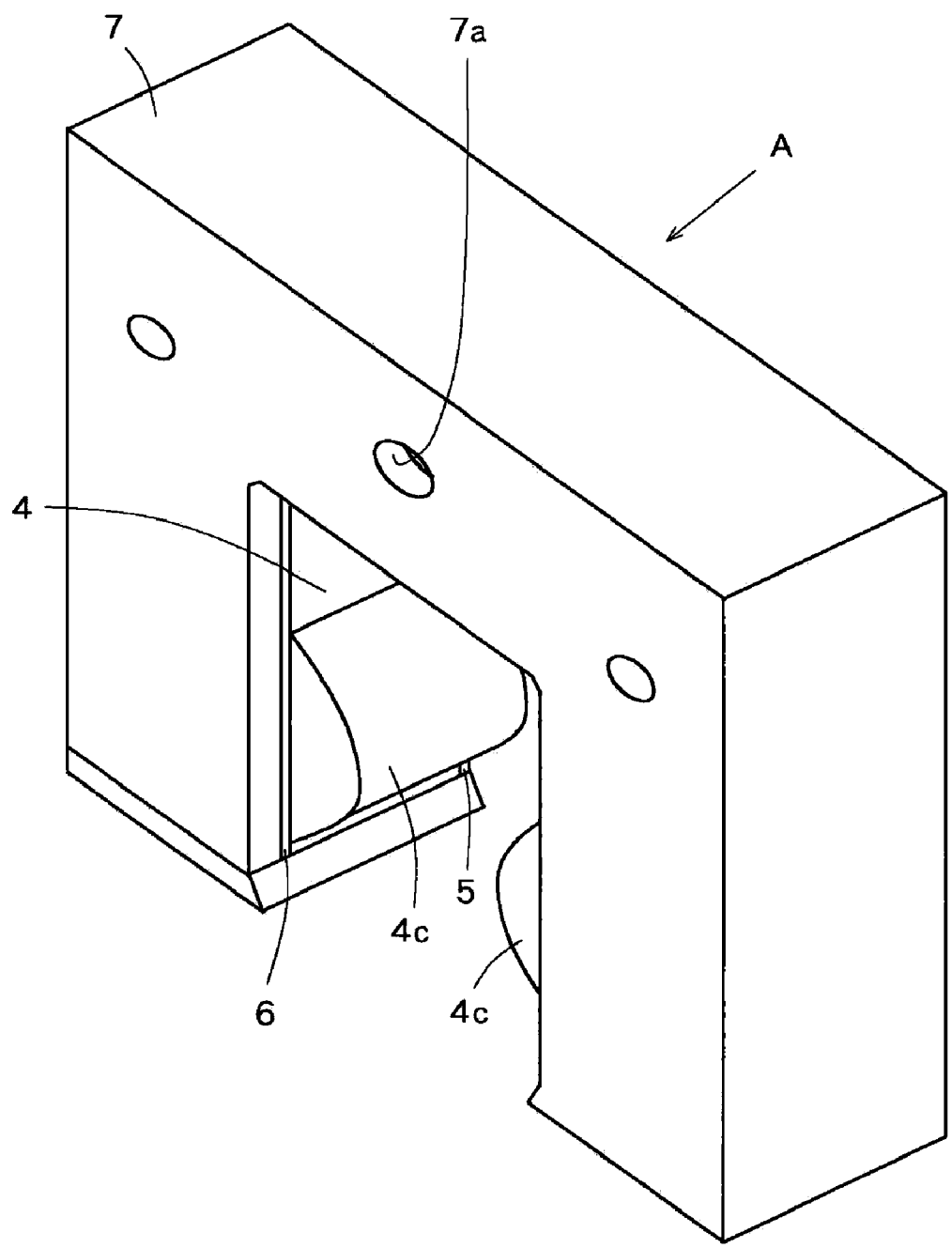
FIG. 2 is a view of the assembly of the lubricating member of the first embodiment.

As illustrated in FIG. 2, the body 4 and the oil packing 6 are mounted in the case 7. The case 7 is formed in a shape covering the outer periphery of the oil packing 6 and the body 4 and the face of the oil packing 6 facing in the sliding direction of the slider S, and has a through hole 7a in alignment with the feed hole 6a of the oil packing 6 when the oil packing 6 is mounted in the case 7.

The aforementioned plate 5 is a metallic member placed on the face of the body 4 opposite to the face on which the oil packing 6 is placed. That is, the body 4 and the oil packing 6 are sandwiched between the case 7 and the plate 5, and all the faces of them, except for the opposing faces of the pair of side portions 4b, are covered with the case 7 and the plate 5.

The lubricating member A structured as described above, as illustrated in FIG. 2, is secured to the casing 1 of the slider S through screws N while the plate 5 is in contact with the end cap 2. In this stage, the end face seal 3 is simultaneously secured to the face of the case 7 which is opposite to the plate 5 secured to the end cap 2.

An insertion hole 3b is drilled in the end face seal 3 secured to the case 7 to be aligned with the feed hole 6a and through hole 7a. Thus, the embedding portion 8 in the body 4 communicates with the outside through the feed hole 6a of the oil packing 6, the through hole 7a of the case 7 and the insertion hole 3b of the end face seal 3.

The slider S with the lubricating member A secured to one of the end caps 2 moves relative to the rail while the contact lubricators 4c of the lubricating member A are in contact with the raceway faces of the rail. The lubricant stored in the body 4 is supplied from the contact lubricators 4c onto the raceway faces of the rail to lubricate the raceway faces.

As the lubricant is supplied from the contact lubricators 4c onto the raceway faces in this manner, the amount of lubricant in the body 4 gradually decreases. However, upon the decrease in the lubricant from the body 4, the lubricant exuded from the saturation holding member 9 gradually seeps into the body 4.

Since the saturation holding member 9 has a larger amount of lubricant held per unit volume than that held in the body 4 as described earlier, although the saturation holding member 9 has a smaller volume than the body 4 has, the saturation holding member 9 is capable of fully supplying the amount of lubricant consumed by the body 4.

When additional lubricant is fed from the saturation holding member 9 to the body 4, the lubricant in the saturation holding member 9 in turn gradually decreases. However, the lubricating member A is capable of refilling the saturation holding member 9 with lubricant as described below.

The embedding portion 8 provided in the body 4 is linked to the outer face of the end face seal 3 through the feed hole 6a, the through hole 7a and the insertion hole 3b.

Then, an injector 10 storing liquid lubricant such as oil is inserted from the end face seal 3 such that the leading end of the injector 10 passes through the feed hole 6a. At this stage, the liquid lubricant is supplied to the saturation holding member 9 fixed in the embedding portion 8, thereby storing up liquid lubricant in the saturation holding member 9, which then makes it possible to feed the lubricant to the body 4 again.

In the lubricating member A according to the first embodiment, since the saturation holding member 9 impregnated with and holding the lubricant is mounted in the body 4, whatever direction the lubricating member A is placed in, the lubricant does not spill out. Accordingly, whatever location and whatever direction the slider is used in, the lubricating member A can be employed in this slider.

The saturation holding member 9 is saturated with and holds the lubricant. This makes it possible to gradually supply the lubricant to the body 4. Accordingly, since a large amount of lubricant is not absorbed by the body 4, the lubricating member A can be prevented from being oversupplied with the lubricant so as to remain in a state of moderate impregnation with the lubricant. Because the body 4 is impregnated with a moderate amount of lubricant as described above, a more than necessary amount of lubricant is not supplied onto the raceway faces and the lubricant is not exhausted earlier than required. In short, the use of the lubricating member A makes it possible to moderately lubricate the raceway faces for a long period.

Since the embedding portion 8 in which the saturation holding member 9 is embedded is sealed by the oil packing 6, the saturation holding member 9 is prevented from drying by being exposed to air. In spite of this, because the oil packing 6 has the feed hole 6a linking the embedding portion 8 to the outside, an additional lubricant can be supplied to the saturation holding member 9 through the feed hole 6a without disassembling the lubricating member A.

The lubricating member A according to the embodiment is provided with the embedding portion 8 located on the side in the sliding direction of the slider S and the embedding portion 8 communicates with the outside through the feed hole 6a. For example, even when another apparatus or the like is mounted on the slider S, this design makes it possible to supply an additional lubricant to the saturation holding member 9 without removing the apparatus from the slider S.

A lubricating member according to a second embodiment will be described below with reference to FIGS. 3 and 4.

The lubricating member of the second embodiment differs from that of the first embodiment in the structure of the blocking member for sealing the embedding portion provided in the body, but is very similar in the structure of other components to the first embodiment. The same components as those in the first embodiment are designated with the same reference numerals as those in the first embodiment and the details are omitted.

Figure 3:
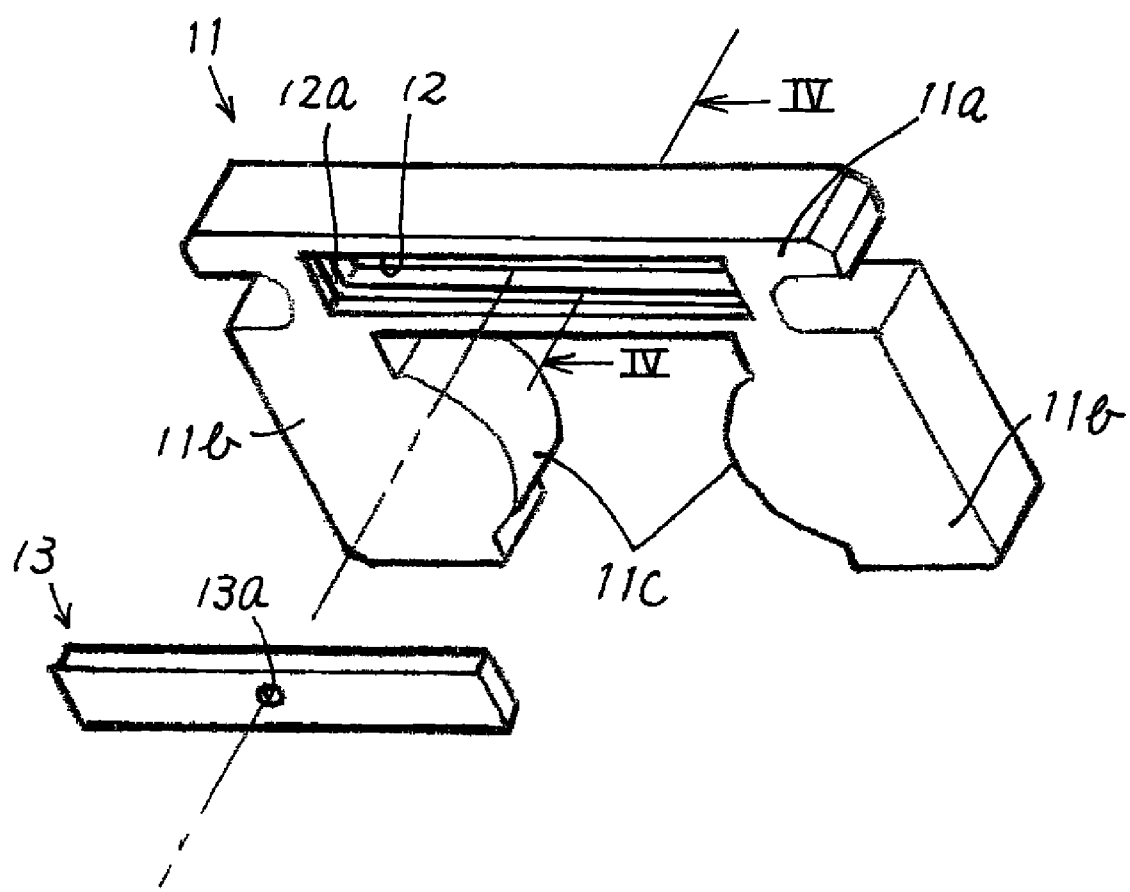
FIG. 3 is a view illustrating a body of a lubricating member and a blocking member in a second embodiment according to the present invention.
Figure 4:
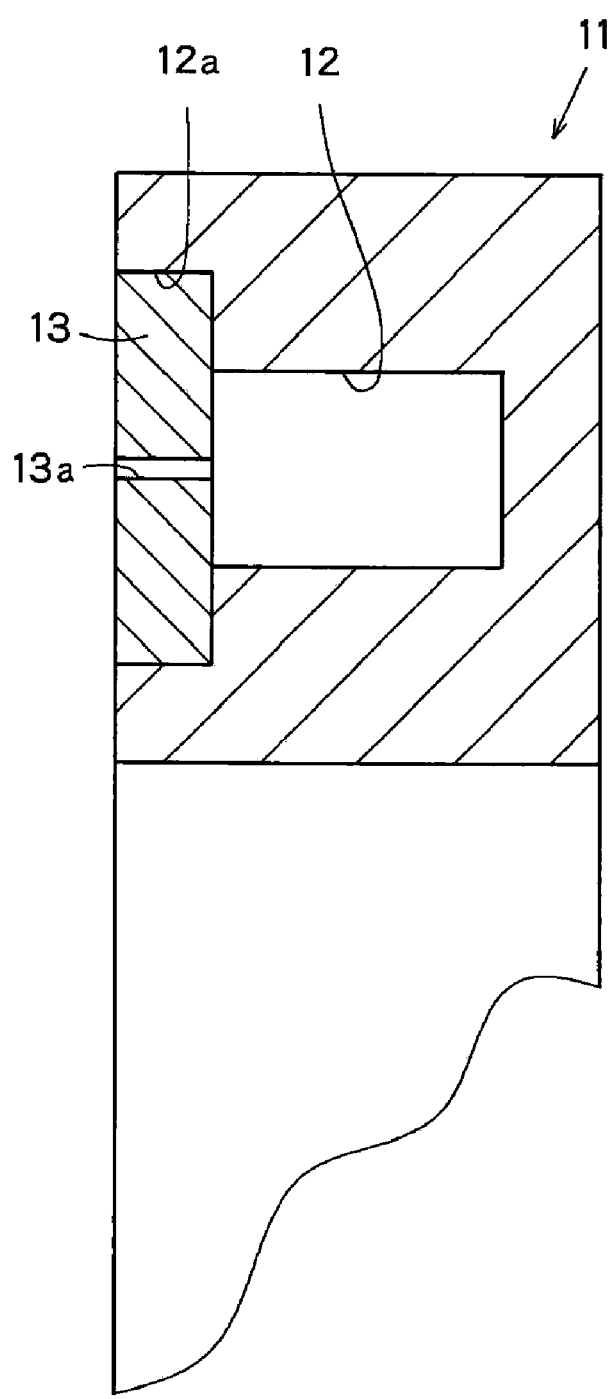
FIG. 4 is a sectional view taken along the IV-IV line in FIG. 3.

As illustrated in FIG. 3, a body 11 has a flatbed portion 11a and a pair of side portions 11b extending out from the sides of the flatbed portion 11a at right angles. Arc-shaped contact lubricators 11c respectively protrude from the opposing faces of the respective side portions 11b. The contact lubricators 11c maintain a dimensional relationship that ensures the contact lubricators 11c are in light contact with the raceway faces on the side faces of the rail when the slider S straddles the rail.

As in the case of the first embodiment, the body 11 is formed, for example, of a synthetic resin with oil through a pressure one-piece molding technique or of a granular synthetic resin which is impregnated with a lubricant after having been molded. The body 11 is a resin-made member in which a lubricant such as oil is immersed in fine continuous foam produced in the molding process.

The flatbed portion 11a of the body 11 incorporates an embedding portion 12 having a recess of which the open end is located in a face of the flatbed portion 11a in the sliding direction of the slider S. The recess of the embedding portion 12 has a rectangular cross section extending between the opposing side portions 11b. A stepped portion 12a is formed at the open end of the embedding portion 12 and has a longer periphery than that of the embedding portion 12 as shown in FIG. 4.

A lid 13 which corresponds to the blocking member of the present invention seals the embedding portion 12. The lid 13 is formed of the same materials as that of the body 11. The lid 13 maintains a dimensional relationship ensuring that the lid 13 is exactly fitted into the stepped portion 12a, and is secured to the stepped portion 12a by being pressed into there or by an adhesive. The saturation holding member 9, which is the same as one in the first embodiment, is embedded the embedding portion 12. When the saturation holding member 9 is inserted in the embedding portion 12 and the lid 13 is secured to the stepped portion 12a, the lid 13 is flush with the body 11.

A feed hole 13a is drilled in the lid 13 for linking the embedding portion 12 to the outside. As a result, the lubricating member of the second embodiment is capable of providing the same beneficial effects as in the case of the first embodiment.

In addition, because the lid 13 is formed of the same materials as those of the body 11, the lid 13 as well as the body 11 can be impregnated and hold the lubricant. When the lid 13 has the function of holding the lubricant, the amount of lubricant held by the entire lubricating member can be increased.

Figure 5:
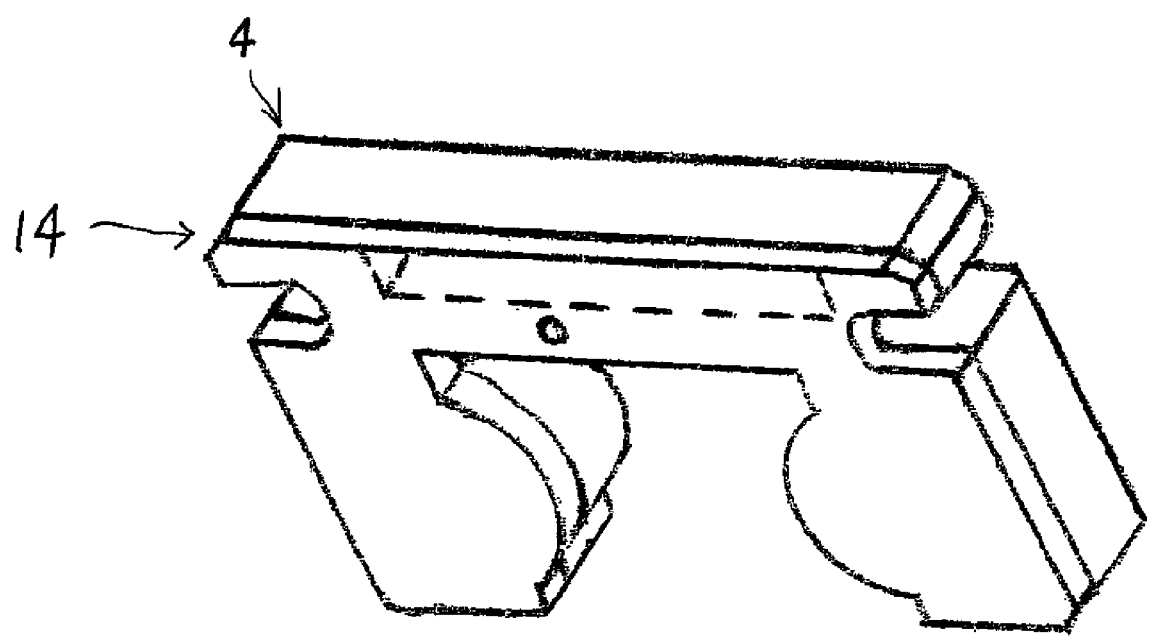
FIG. 5 is a view illustrating a body of a lubricating member and a blocking member in a third embodiment according to the present invention.

In order to increase the amount of lubricant held by the entire lubricating member, the blocking member can be provided by a lid 14 which is formed of the same materials as those of the body and has the same flat shape as that of the body as in a third embodiment shown in FIG. 5. As a result, it is possible to provide the same beneficial effects as those in the first and second embodiments.

Next, a lubricating member of a fourth embodiment will be described with reference to FIG. 6.

The lubricating member of the fourth embodiment differs from that of the first embodiment in the structure of the body and the blocking member for sealing the embedding portion provided in the body, but is very similar in the structure of other components to the first embodiment. The same components as those in the first embodiment are designated with the same reference numerals as those in the first embodiment and the details are omitted.

Figure 6:
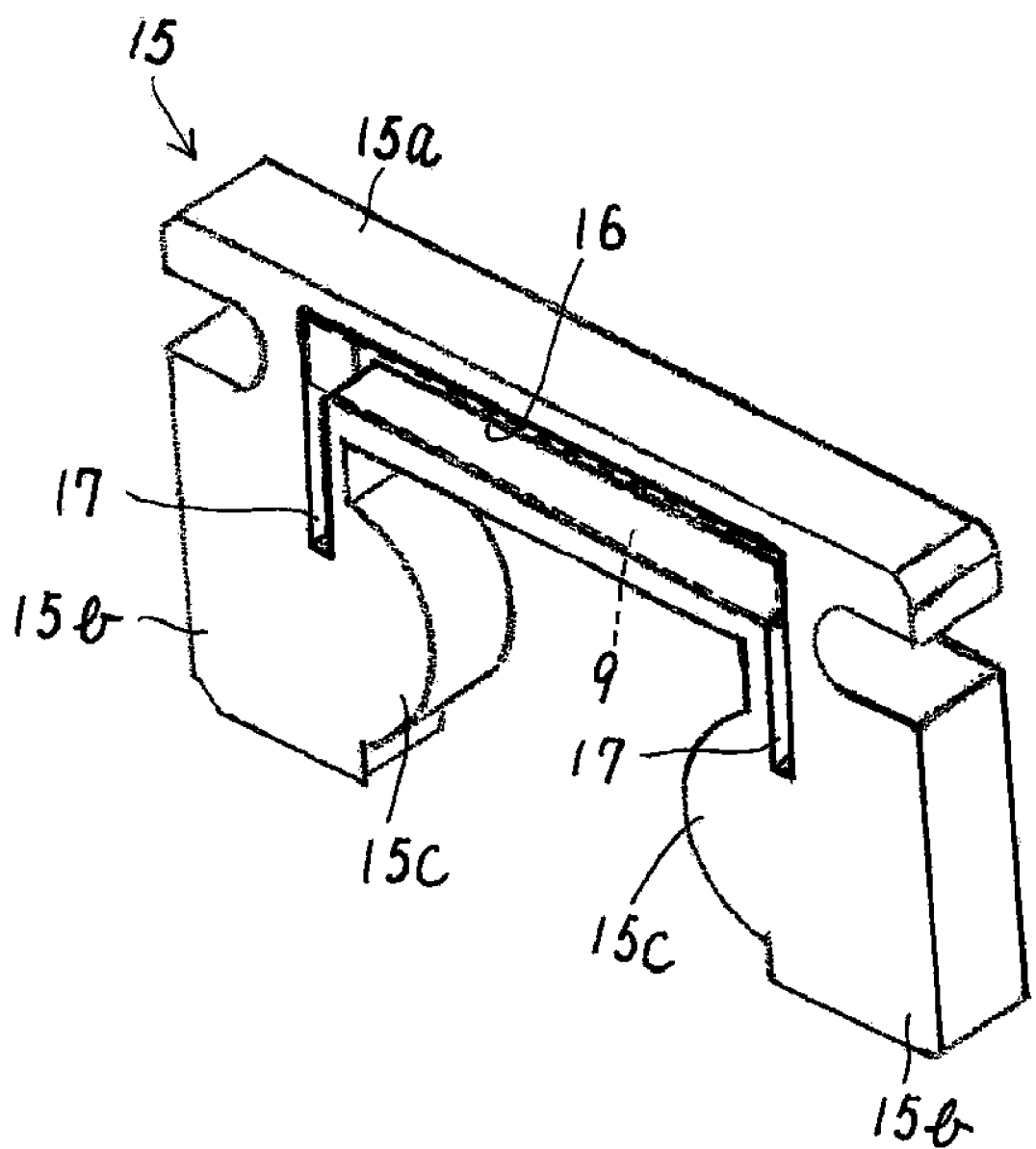
FIG. 6 is a view illustrating a body of a lubricating member in a fourth embodiment according to the present invention.

As illustrated in FIG. 6, a body 15 has a flatbed portion 15a and a pair of side portions 15b extending out from the sides of the flatbed portion 15a at right angles. Arc-shaped contact lubricators 15c respectively protrude from the opposing faces of the respective side portions 15b. The contact lubricators 15c maintain a dimensional relationship that ensures the contact lubricators 15c are in light contact with the raceway faces on the side faces of the rail when the slider S straddles the rail.

As in the case of the first embodiment, the body 15 is formed, for example, of a synthetic resin with oil through a pressure one-piece molding technique or of a granular synthetic resin which is impregnated with a lubricant after having been molded. The body 11 is a resin-made member in which a lubricant such as oil is immersed in fine continuous foam produced in the molding process.

The flatbed portion 15a of the body 15 incorporates an embedding portion 16 having a recess of which the open end is located in a face of the flatbed portion 15a in the sliding direction of the slider S. The recess of the embedding portion 16 has a rectangular cross section extending between the opposing side portions 15b of the body 15. The ends of the embedding portion 16 respectively communicate with two reservoirs 17 extending from these ends toward the leading ends of the side portions 15b.

These reservoirs 17 are spaces for storing a liquid lubricant. The liquid lubricant stored in the reservoirs 17 and the lubricant held by the saturation holding member 9 embedded in the embedding portion 16 are both used to adjust the amount of lubricant supplied to the body 15.

With the aforementioned structure, the liquid lubricant is supplied from the reservoirs 17 to the body 15, so that a large amount of lubricant is held by the body 15. For this reason, in the initial stage of use of the slider, the rail can be evenly lubricated by a large amount of lubricant supplied from the body 15.

After the slider S has slid on the rail to some extent and all the liquid lubricant stored in the reservoirs 17 have been completely supplied to the body 15, the lubricant held in the saturation holding member 9 is in turn supplied gradually to the body 15. Because the lubricant is gradually supplied from the saturation holding member 9 to the body 15 as described earlier, the lubricating member can remain in a state of moderate impregnation with the lubricant and appropriately lubricate the raceway faces over a long period.

In addition to the same beneficial effects as those provided in the first embodiment, the lubricating member of the fourth embodiment is capable of suitably lubricating the raceway faces depending on use condition because the amount of lubricant supplied to the body 15 is adjusted by the reservoirs 17 and the saturation holding member 9.

Figure 7:
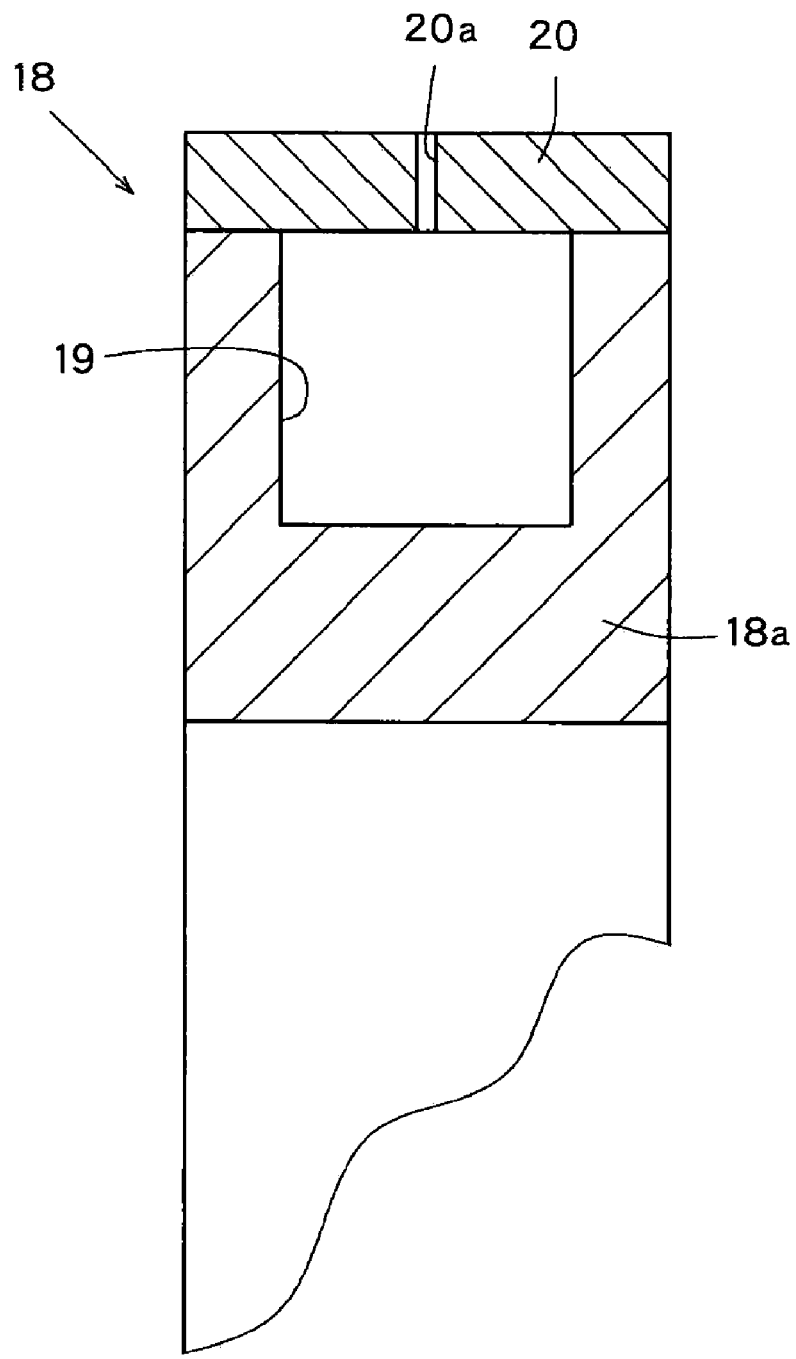
FIG. 7 is a sectional view illustrating a body of a lubricating member in a fifth embodiment according to the present invention.
Figure 8:
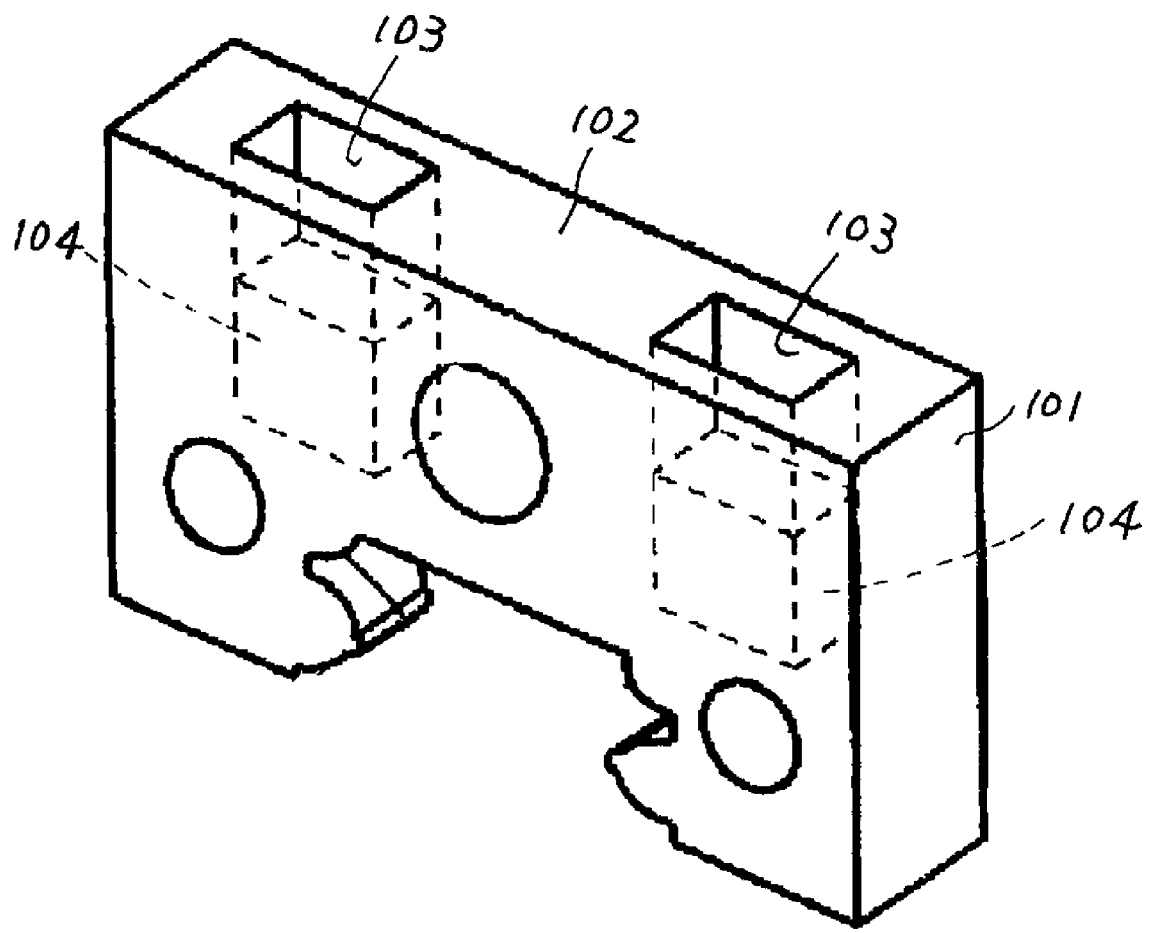
FIG. 8 is a perspective view illustrating a conventional lubricating member.

In each of the foregoing embodiments, the embedding portion is formed in the face of the body facing in the sliding direction of the slider S. However, an embedding portion as described in a fifth embodiment illustrated in FIG. 7 can be employed. The embedding portion 19 has an open end formed in a face of a flatbed portion 18a of a body 18 facing in a direction perpendicular to the sliding direction of the slider S (the face opposite to the face from which the side portions extend out). The open end may be sealed by the blocking member which is a lid 20 with a feed hole 20a in the embodiment. However, when the open end of the embedding portion is formed in the face of the body facing in the sliding direction of the slider S as described in the first to fourth embodiments, an additional lubricant can be easily supplied to the saturation holding member even if another apparatus or the like is mounted on the slider S.

In each of the foregoing embodiments, the embedding portion has a recess having an open end, but may have a through hole with two open ends. Either an embedding portion or a plurality of embedding portions may be provided.

In each of the foregoing embodiments, only one feed hole is provided, but a plurality of feed hole may be provided. If a plurality of feed holes are provided for a single embedding portion so that additional lubricant is supplied from each of the feed holes, the lubricant can be supplied uniformly to the saturation holding member.

The lubricating member may be mounted on one of the end cap. Alternatively, it goes without saying that the lubricating members may be mounted on the two end caps.

In the second and third embodiments, the blocking member and the body are formed of the same materials, but they may not be necessary formed of the same materials. Even if the blocking member and the body are formed of different materials, as long as the blocking member is capable of being impregnated with the lubricant, the same beneficial effects are provided.

The feed hole located closet to the saturation holding member is provided for injecting the lubricant. The feed hole has a small diameter in order to prevent a leak of the lubricant injected into the saturation holding member. For this purpose, the diameter of the feed hole is desirably 2 mm in practical use.

What is claimed is:

1. A slider used in a linear motion rolling guide unit, comprising a pair of end caps respectively secured to ends of a casing, endless circulating passages which are provided inside the casing and the end caps and in which rolling elements are incorporated and roll, and a lubricating member comprising a body impregnated with a lubricant and attached to either one or both of the end caps, the lubricating member impregnated with the lubricant being in contact with raceway faces of a rail to supply the lubricant to the raceway faces while the rolling elements rolling on the raceway faces to move the slide relative to the rail, comprising:

either an embedding portion or a plurality of embedding portions having a recess, and provided in the body of the lubricating member;

a saturation holding member embedded in the embedding portion of the body, holding a larger amount of lubricant per unit volume than the lubricant per unit volume held by the body, and having a relationship ensuring that the saturation holding member has a force sucking the lubricant by capillary action or surface tension equal to or smaller than that the body has;

wherein the body comprises a blocking member attached thereto for sealing the embedding portion, and the blocking member has either a feed hole or a plurality of feed holes for linking the embedding portion to outside;

wherein the blocking member is formed of the same materials as those of the body; and wherein the embedding portion has an open end facing in a sliding direction of the slider.

* * * * *